US008165762B2

(12) United States Patent
Popp et al.

(10) Patent No.: US 8,165,762 B2
(45) Date of Patent: Apr. 24, 2012

(54) METHOD OF OPERATING A TRANSMISSION SYSTEM VALVE CONFIGURATION

(75) Inventors: Christian Popp, Kressbronn (DE);
Thilo Schmidt, Meckenbeuren (DE);
Klaus Steinhauser, Kressbronn (DE);
Christoph Braun,
Uhldingen-Muhlhofen (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 566 days.

(21) Appl. No.: 12/369,333

(22) Filed: Feb. 11, 2009

(65) Prior Publication Data
US 2009/0206292 A1   Aug. 20, 2009

(30) Foreign Application Priority Data

Feb. 15, 2008   (DE) .......................... 10 2008 000 304

(51) Int. Cl.
*F16H 59/70*   (2006.01)
(52) U.S. Cl. ................ 701/51; 251/129.05; 251/129.08; 474/28
(58) Field of Classification Search .................... 701/51, 701/87; 474/18, 28; 251/129.01, 129.05, 251/129.08, 129.15
See application file for complete search history.

(56) References Cited

U.S. PATENT DOCUMENTS

| | | | | | |
|---|---|---|---|---|---|
| 5,060,747 | A | * | 10/1991 | Eto | 180/197 |
| 5,083,982 | A | * | 1/1992 | Sato | 474/28 |
| 5,168,955 | A | * | 12/1992 | Naito | 180/197 |
| 5,222,417 | A | * | 6/1993 | Sato | 474/28 |
| 5,418,725 | A | * | 5/1995 | Eto | 701/87 |
| 5,432,693 | A | * | 7/1995 | Anderson | 363/41 |
| 5,894,758 | A | * | 4/1999 | Walker | 74/335 |
| 7,192,005 | B2 | * | 3/2007 | Denyer et al. | 251/129.08 |
| 7,206,180 | B2 | * | 4/2007 | Kuehn et al. | 361/152 |
| 2007/0251477 | A1 | * | 11/2007 | Nozawa et al. | 123/90.17 |
| 2009/0225489 | A1 | * | 9/2009 | Lehner et al. | 361/152 |

FOREIGN PATENT DOCUMENTS

| | | |
|---|---|---|
| DE | 19930965 | 1/2001 |
| DE | 10114374 | 6/2002 |
| DE | 10131767 | 1/2003 |
| DE | 102006012657 | 9/2007 |

OTHER PUBLICATIONS

Dr. Bernhard Kirsh and Dr. Harald Geis, "Einbindung elektromagnetischer Aktoren in die Systemarchitektur von Fahrzeugen", Technische Mitteilungen 97 (2004) Heft 1, pp. 4-13.

\* cited by examiner

*Primary Examiner* — Paul N Dickson
*Assistant Examiner* — Timothy Wilhelm
(74) *Attorney, Agent, or Firm* — Davis & Bujold, P.L.L.C.

(57) ABSTRACT

A method of operating a valve system of a transmission comprising part of the vehicle drive train through a valve unit and said valve unit's electro-magnetic activator configuration. In a transmission's hydraulic system and is part of the vehicle drive train, its hydraulic pressure value (p_EDS) can be employed and adjusted through a valve unit configuration by applying a pulse-width-modulated current signal (i_EDS) to the electro-magnetic activator system. The pulse-width modulated current signal (i_EDS) and its amplitude (A) and/or its pulse duration (pw1) will periodically change, during the applied Dither-Modulation, by maintaining the required pressure value (p_EDS) at the same time, whereby a length-wise movable anchor, which is attached a valve shaft of the valve system, receives hereby an imposed vibrating oscillation. According to the invention, the Dither-Modulation is activated or deactivated during pre-defined operating conditions of the vehicle drive train.

16 Claims, 3 Drawing Sheets

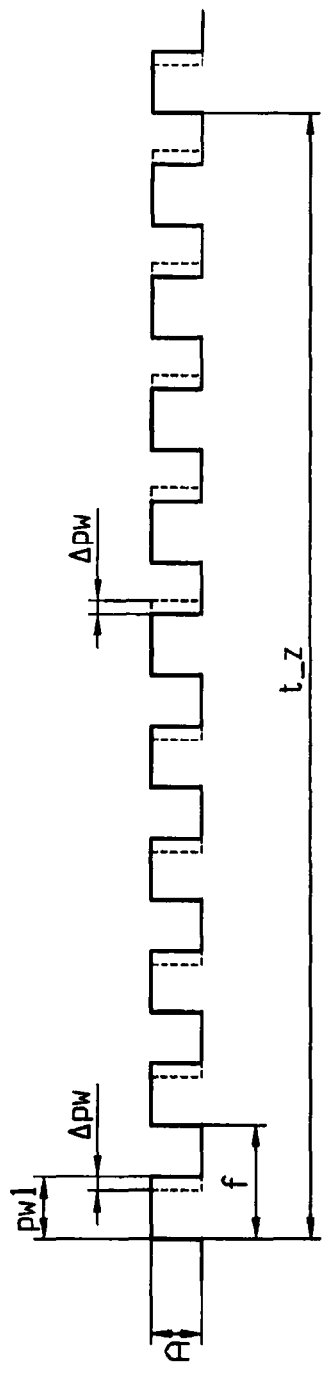
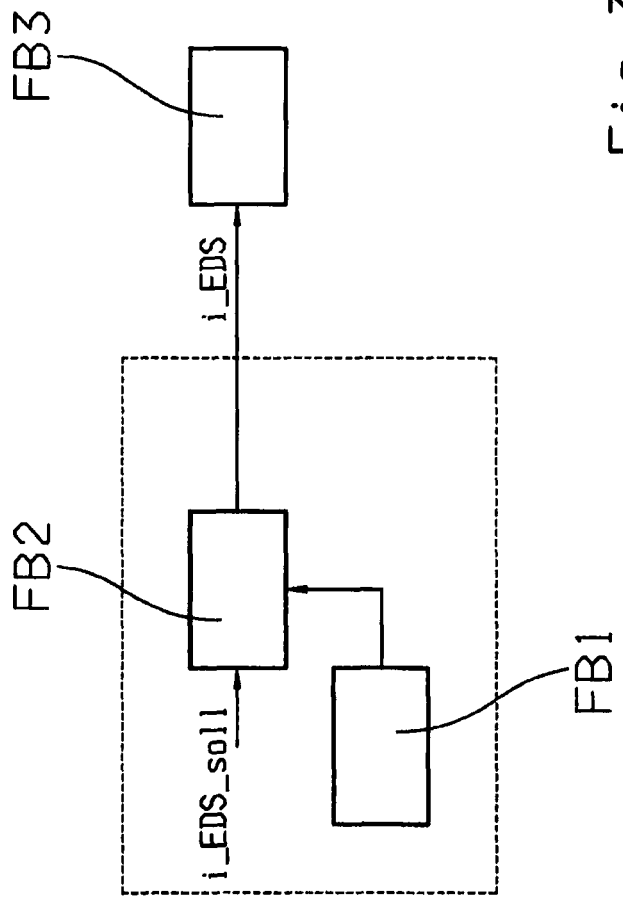
Fig. 2
Fig. 3

METHOD OF OPERATING A TRANSMISSION SYSTEM VALVE CONFIGURATION

This application claims priority from German Application Serial No. 10 2008 000 304.2 filed on Feb. 15, 2008

FIELD OF THE INVENTION

The invention describes a method of operating a valve configuration of a transmission system of a vehicle drive train in accordance with the definition in the specification and the drawings.

BACKGROUND OF THE INVENTION

The desire to operate vehicles with the highest possible driving comfort, also having a high and spontaneous automatic transmission, which can transmit more and more torque, results in continuously, increasing requirements of the functionality of the vehicles equipped with electro-hydraulic steering and an automatic transmission. A higher ability to transfer the torque of an automatic transmission reduces a flow-torque-resolution in the area of electro-hydraulic actuators, which can only be solved through a large and unreasonable effort.

In addition, the increased effort is a result of the development of new methods of manufacturing, whereby manufacturing tolerances have to be revisited at the manufacturer site and maybe even to be tightened. Also, the additional development of implementations become necessary, through which the remaining manufacturing tolerances, or their effect in regard to the behavior during the operation of automatic transmissions, can possibly be reduced to an absolute minimum.

Both scenarios will usually result in an increased effort and cost for the control, monitoring, and the manufacturing process, which is not intended and not desirable.

In an article in Technische Mitteilungen 97 (2004), Volume 1, Page 4 to 13, "Implementation of Electro-Magnetic Actuators into the System Architecture of Vehicles," a cost effective process and implementation is described using electro-mechanic and electro-hydraulic transponders in passenger vehicles, which generally are being used in hydraulic aggregates as proportional pressure valves or flow control valves. In mechanical systems, actuators based on switching and proportional magnets are often being used to perform the lock or release function for the activation of devices.

The dynamics and the precision of a machine, operated through an electro-hydraulic concept, is generally determined by the precision and flow control of such actuators, also by trying to optimize the dynamics and precision of the flow control.

A usually unavoidable friction generated when using pilot valves is often the main reason for a finite durability of the system and it works against an intended system optimization of the actuators. As an example, the plotted graph of a proportional pressure reduction valve shows, when describing the relationship between output pressure at a control output of a valve, under a constant pressure feeding condition at the input and the return path and the current in the coil of an electro-magnetic actuator, that an offset exists between the rising, increasing, current slope and the falling, descending, current slope, caused through mechanical friction in the valve, generally known in the art as the hysteresis. The width of the hysteresis of an actuator functioning as a valve limits the ability of reproducing the actuator position and also limits the functionality of the system components, connected to the actuator, which follow.

To reduce the friction and minimize the hysteresis of the valve and using a commonly known valve in the art and technology, a so called Dither-Modulation, where the current in the coil of the electro-mechanic valve being modulated by a Dither-Signal, which comprises a low frequency square wave in the range of 100 Hz to 1000 Hz. The actuator anchor and the electro-mechanical parts of the actuator, physically connected to the valve gate, are undergoing a vibration. The amplitude of the Dither-Signal will be adjusted in a way to levels that there are no unwanted fluctuations caused with regard to the pressure in the hydraulic system. The vibration causes a reduction of the friction in the valve and, therefore, a reduction of the hysteresis, which improves the resolution of the system and the reproducibility of the actuator operation and position.

A disadvantage, however, is the fact that the Dither-Signal modulation, and its low frequency vibration, cause an increased wear in the area of an electro-hydraulic valve system and, therefore, it reduces the life of a valve.

SUMMARY OF THE INVENTION

The inventive objective is to provide a process for a configuration of a valve system in which the operation of the valve system becomes cost effective, at high precision, and at the same time causing less wear.

The invented process to operating a valve configuration in a transmission as part of the vehicle drive train, comprising a valve unit and an electro-mechanical actuator which operates the valve unit, where through the valve unit, the actuator and a related pulse-width modulated signal at the actuator will produce an adjustable hydraulic pressure value of the hydraulic system in the transmission of the vehicle drive train, also generating an amplitude and/or a pulse duration of the pulse-width modulated signal through an overlay of the pulse-width modulation with the Dither-Modulation where under maintaining the amount of pressure the pulse duration changes periodically, and the lengthwise movable actuator anchor and the physically connected valve shaft are exposed to the modulation and they will assume the vibration accordingly.

In this invention, the Dither-Modulation will be activated or de-activated in accordance with existing, pre-defined operating conditions.

The valve system amount of the hysteresis during pre-defined operating conditions of the vehicle drive train, i.e., during certain phases of the shifting sequences in the gear device, will be reduced through a simple and cost effective method, for instance, the excitation of the valve system, preferably based on the electric pressure regulator concept, configured as of single or multiple coupling, can be optimized through improved accuracy of the amount of pressure, and the work load and resources of a computer processor, i.e., run time, needed memory size, or similar, can be limited in a simple way.

The fact that the pulse-width modulation will only be applied under pre-determined conditions and that a so-called Dither will be superimposed, or the Dither-Modulation will only be activated during pre-defined operating conditions, any possible negative factors which might affect the long-term duration of the valve system, will be substantially reduced as compared to known and current state-of-the-art procedures.

In an advantageous variation of this invention, the Dither-Modulation will be activated or be de-activated in case the valve system pre-adjusted pressure value setting will be exceeded. Thereby, the adjustable pressure value of the valve system, as well as the hysteresis of the valve system characteristics will only be varied within the operating ranges, any disadvantages of the Dither-Modulation activation become only effective during the operating conditions in which the reduction of the hysteresis, through the Dither-Modulation, represents a significant advantage.

The pre-determined value of pressure will be modified in an advantageous variation of this invention, dependent on the temperature, and/or depending on an adopted routine, to exactly match the method with the actual point of operation of the vehicle drive train or its transmission system configuration.

Another advantageous variation of this invention is the activation or de-activation of the Dither-Modulation in correlation with the torque applied to the transmission system. It causes, in the lower load range or push operation of the vehicle power train, just minimal changes in the vehicle acceleration, which cause reactions on the drive side and these will be noticed by a driver as an interfering phenomena with regard to the driving comfort, but these phenomena will be avoided by the invention in a simple way. As an example, the changes in the acceleration during gear ratio changes in the transmission are caused by an unwanted, abrupt opening and closing of engaging or dis-engaging of a switching element, resulting in an inaccurate pressure setting in the switching element of the matching valve system.

An additional, advantageous variation of this invention, when a current based signal will be changed, depending on a pre-determined gear ratio change during the Dither-Modulation, the Dither-Modulation can be activated in the ranges of pre-defined gear shifts, i.e., during a comfortable driving method, or can be de-activated outside of these gear shift ranges, i.e., during a more aggressive driving and gear shifting, to match the hysteresis with the present state of operation of the vehicle drive train, or the gear system, or to match it with the type of the vehicle to achieve an improvement of the pressure settings.

An additional advantageous variation of this invention has the Dither-Modulation, during the processing of an adoption routine, either activated or de-activated, in a state of a deactivated adoption routine either added or switched off, within defined operating temperatures of the different vehicle components in the vehicle drive train, such as the transmission configuration, either activated or deactivated, depending on the actual shift status, i.e., just rolling out, either activated or deactivated, depending on the actual shift status, i.e., the filling equalization phase, being activated or deactivated and/ or that the pulse width modulated current signal at the electromagnetic unit is being changed through the Dither-Modulation, depending on the gradient of the valve configuration settings, to improve the wear caused by the operating conditions and to reduce the hysteresis of the electro-hydraulic control in the pressure control unit.

By making the switching element operating pressure of a transmission tunable through a valve system configuration, which is designed to accomplish and to set the different gear ratios, and if the configuration presents different supporting factors to the different gear ratios available, a further advantageous variation of this invention is to activate or deactivate the Dither-Modulation, depending on other available supporting factors.

For this reason, an easy way to reduce the hysteresis of a valve system exists if the supporting factors of the automatic transmission, in which the presence of unfavorable sensitivities of the vehicle drive train in view of torque changes effect the driving comfort, and the presence of the supporting factors, in which torque changes essentially have no effect in view of driving comfort, to operate the valve system in this case without the Dither-Modulation method of the hysteresis reduction.

At the same time, unfavorable sensitivities in the vehicle drive train cause an operating sequence, in which small changes of the pressure will cause reactions in the area of the transmission, very noticeable to the vehicle operator. For that reason and in this situation, an activation of the Dither-Modulation will become advantageous to reduce the hysteresis of the valve system.

Because certain clutch systems in automatic transmissions show, due to some larger design tolerances, and the electric current based signal of the valve system will, in a further variation of this invention through the Dither-Modulation during the pre-defined state of operating sequences of the vehicle drive trains, depending on tolerances of the valve systems switching element which is exposed to pressure, be modified so that the valve systems hysteresis will be reduced to an amount which represents an improvement in regard to the required pressure activation.

In order to have a fairly high pressure accuracy in the valve system, the amplitude and/or the frequency of the Dither-Modulation, in a further, advantageous variation of this invention, will be adjusted depending on pressure accuracy as compared to the valve systems stability in an oscillation, whereby the setting is performed in a way so that the pressure accuracy is still high at a sufficient oscillation stability of the system.

In that case, the targeted parameters are being determined through tests and simulation, whereby the settings are being compared to the different operating condition parameters, i.e., an operating temperature of a transmission system, a proper pressure value for a valve system, adjustment velocity of the valve system and/or the pressure gradient, and these parameters will be entered into and confirmed by system software.

An additional advantageous variation of this invention changes the amplitude and/or the frequency of the Dither-Modulation, in relationship to the different states of operation, to exactly match the activation of a valve system to an actual operating condition of the vehicle drive train.

To avoid damage to the valve system, a further variation of this invention detects and calculates a self-induction, in the area of the electro-magnetic activation unit, should any unwanted excess of the self induction threshold exists which is causing bouncing of the valve fitting of the valve system. This variation of this invention is able to verify the bouncing of the valve in the valve system, similar to the tap sound of valve systems in a combustion engine. If the tolerances of the system cause the bouncing or if the system needs to be operated near the system limits, at which point there is a high probability bouncing might occur, counter measures can be initiated in this invention, depending on the state of operating and the life of the valve system can be extended through minimal effort.

More advantages and possible beneficial continuations of this invention are listed in the claims, referencing the drawings by describing this particular example:

BRIEF DESCRIPTION OF THE DRAWINGS

Shown is:

FIG. 2 is the principal progression of the valve system electrical drive current in regard to an activated and deactivated Dither-Modulation.

FIG. 3 is a very simplistic block diagram presentation of the software implementation of the Dither-Modulation into the activation routine of an electromechanical activator unit of the valve system unit.

DETAILED DESCRIPTION OF THE DRAWINGS

Figure 1:
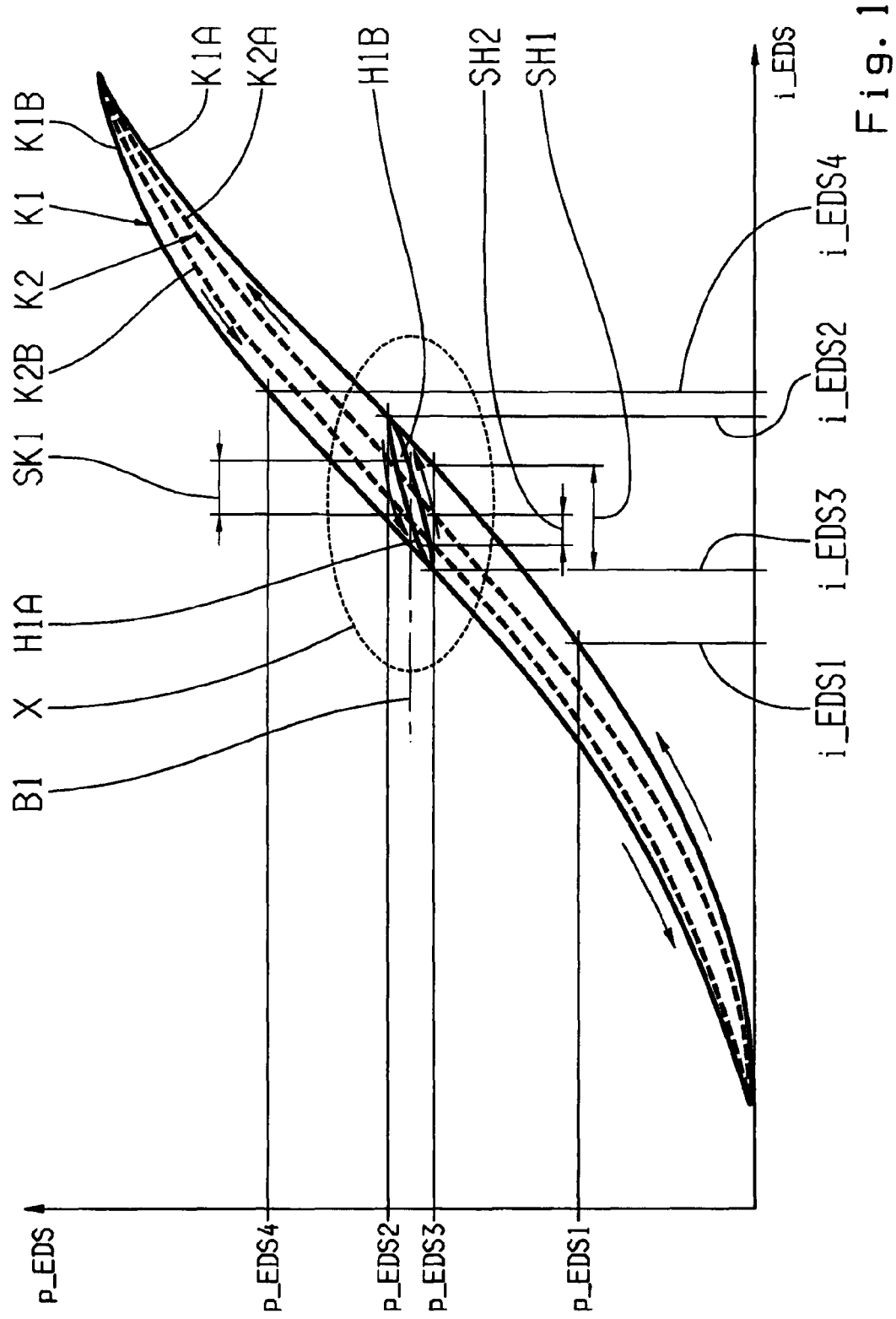
FIG. 1 are two characteristic curves of a valve system, which appear through an activated or deactivated Dither-Modulation, showing the different hysteresis conditions.

FIG. 1 presents two pressure-current characteristic curves K1 and K2, not explained further in the drawing but well known and typical in the industry, with regard to valve systems of a transmission system in a vehicle drive train, including the valve system and its activating electro-mechanic activator unit. In this particular example and through the valve system unit, a hydraulic pressure value of a hydraulic system in the transmission system of the vehicle drive train will be established, depending on a pulse width modulated electric current signal of the electro-mechanic activator unit, as further described and shown in FIG. 2. The pressure value represents an initial amount of pressure which is being used to initiate the additional valve system that follows, through which an activation pressure value becomes available to the transmission system, such as for a non-slip clutch or for a brake system.

The partial characteristic curves K1A and K2B, of the two pressure-current characteristic curves K1 and K2, are being determined through a simulated load at the control output and during the current ramping condition, as compared to the partial characteristic curve K1B and K2B in both curves K1 and K2, being determined at the time of the descending current pattern.

In addition, the pressure-current characteristic curves K1 and K2 represent the dependency between the valve system hydraulic pressure value and an average drive current i_EDS for the electro-magnetic activator unit of the transmission valve system. Here, the partial characteristic curve K1A and K1B of the first pressure-current curve K1, and also the partial characteristics curve K2A and K2B in the second pressure-current curve K2 display an offset against each other, mainly generated through mechanical friction in the area of the valves in the valve system, and commonly known and acknowledged as the hysteresis.

The average drive current i_EDS of the valve system is being generated through a pulse-width modulated current signal, adjacent to the electro-magnetic activator unit, whereby the pulse-width modulation, as shown in FIG. 2, is being operated with the form of a square wave frequency of 100 Hz. The square wave frequency can vary from the previously mentioned case or vary in the value to accommodate different system specific functionalities of a valve system.

In the example in FIG. 2, the current signal pulse-width modulation shows ten current pulses in a 10 millisecond timing cycle t_z, each being generated in a shape of a square wave. The first pressure-current characteristic curve K1 adjusts itself, at a constant pulse width pw1, a constant amplitude A or a constant pulse height, as well as in a constant frequency f or in a constant period of the pulse-width modulation. This generates the first pressure-current characteristic curve K1 over a pulse-width modulation at a constant frequency f and constant duty cycle, which represents the ratio between the pulse width and the period of the pulse-width modulation.

The second pressure-current characteristic curve K2 establishes itself mainly through the dependency between the pulse-width modulation adjacent to the electro-magnetic activator unit, when the pulse-width modulation is superimposed with the so called Dither-Modulation. The example in the drawing shows in the case of an activated Dither-Modulation the pulse width pw1 of the first five current pulses of each cycle t_z of the pulse-width modulation which are being reduced by the amount indicated by Δpw, and the pulse width pw1 of the following five current pulses of each cycle t_z, at constant frequency f, being reduced by the value of Δpw.

The superimposed Dither-Modulation and the periodic reduction and increase of the pulse width pw1 of the current pulses of the pulse width modulation generates a vibration oscillation in the anchor of the electro-magnetic activator unit and also in the adjacent valve shaft of the valve system, this reduces the friction and therefore also the hysteresis of the valve system. Consequently, the accuracy of the pressure drive control of the valve system improves.

Because the superimposed Dither-Modulation and the generated vibrating oscillation cause an increased wear in the valve system area, the Dither-Modulation, as an overlay to the pulse-width modulation, will only be applied in the case of pre-defined operating conditions of the vehicle drive train or the transmission system, respectively, so that the valve system operates in a very similar pattern as shown in the second pressure-current characteristic curve K2. Outside of these pre-defined operating states, the Dither-Modulation will be deactivated and the performance of the valve system matches the first pressure-current characteristic curve K1. It means that the Dither-Modulation will only be activated during defined modes of operation and not outside of pre-defined modes of operation, whereby the run time burden of an electro-hydraulic transmission system processor is only increased in certain operating situations.

If a current is induced into the electro-magnetic activator unit, starting at the increasing slope of the current with the first current value i_EDS1 and a simultaneously deactivated Dither-Modulation, the average drive current EDS increases along the partial characteristic curve K1A and also the first pressure-current curve K1. Is the average drive current i_EDS to be reduced because of an appropriate pressure request initiated by the second current value i_EDS2, the pressure value p_EDS2 originally initiated by the valve system and corresponding with the second current value i_EDS2—is being lowered, starting from the second partial characteristic curve K1B of the first pressure-current characteristic curve K1, along a first hysteresis plot H1A into the direction of the second partial characteristic curve K1B, whereby the hysteresis curve H1A at a current value i_EDS3, again with a corresponding pressure value p_EDS3 of the second partial characteristic curve, correlates. In case of reducing the average drive current i_EDS further, the pressure value p_EDS, set in the valve system, changes along the second partial characteristic curve K1B.

In the presence of the electro-hydraulic transmission control request, i.e., for a fourth current value i_EDS4 at a descending current slope, to reduce the pressure p_EDS at the valve system, the pressure value p_EDS, issued by the valve system, changes along the second partial characteristic curve K1B of the first pressure-current characteristic curve K1, if the current width modulation is being enabled without the overlay of the Dither-Modulation. With the increasing reduction of the average drive current I_EDS, the average drive current I_EDS drops, for instance, to the third current value i_EDS3. In the case of a request in regard to the third current value i_EDS3 from the electro-hydraulic transmission control to increase the pressure p_EDS, which will result in an increase of the average drive current i_EDS, the pressure value p_EDS, which is set by the valve system, increases in accordance with the rising current value i_EDS, initially along the second hysteresis curve H1B, towards the direction of the first curve K1A. Beginning with the second current value i_EDS2, the pressure p_EDS of the first partial characteristic curve K1A increases in accordance with increasing current values of i_EDS.

If, as in the previously described manner, the Dither-Modulation is being superimposed onto the pulse width modulation, in certain states of operation or operating states of the vehicle drive trains, the two partial characteristic curves K2A and K2B limit the current hysteresis of the valve system main signal, which is smaller during activated Dither-Modulation and larger during de-activated Dither-Modulation. Here, the high-signal current hysteresis of the valve system, without the Dither-Modulation, is shown in reference SH1, and the valve system main signal current hysteresis with an activated Dither-Modulation is shown as SH2.

The current hysteresis of the valve system low-signal is independent of the state of the Dither-Modulation and is here corresponding with the distance between the point of intersection of line B1 with both hysteresis curves H1A and H1B. In the drawing, the current hysteresis of the valve system low-signal is represented through SK1. The low-signal current hysteresis occurs during the control of an operating parameter of the vehicle drive train, which generates the request for changing the pressure p_EDS along the two hysteresis curves H1A and H1B, without changing over from the partial characteristic curve K1A to partial curve K1B, or from partial curve K2A to partial curve K2B, or without changing to the reverse direction.

Herewith, the transmission input rotational speed, preferably designed as an automatic transmission system, is regulated and the initial input pressure for an activator valve of a switching element following a valve system, in correlation with a rotational speed gradient of the transmission rotational speed, is being changed through the valve system, through altering of the average drive current.

Because the shown hysteresis between the two partial characteristic curves K1A and K1B in the first current-pressure characteristic curve K1 is larger in the deactivated Dither-Modulation state, than in an activated Dither-Modulation state, significantly larger pressure values of the valve system have to be regulated as compared to an activated Dither-Modulation, and this is one reason why the valve system has a longer response time in the case of the deactivated Dither-Modulation.

FIG. 3 shows a simplified block diagram of an operating procedure, as part of the transmission electro-hydraulic transmission control, in which the Dither-Modulation is superimposed to the pulse-modulated current signal i_EDS, with the objective to reduce the high-level current hysteresis.

Hereby, the first functional unit FB1 represents the superimposed Dither-Modulation onto the pulse-width modulation and its de-activation or activation depends on different states of operation or different operating parameters with the vehicle drive train. In addition, the Dither-Modulation amplitude and the frequency is being altered, dependent on operating parameters and a state of operation, to reduce the valve system high-level current hysteresis for pre-defined states of operation of the vehicle drive train in the way as described, and to improve the accuracy of the valve system pressure input drive, whereby the pressure accuracy should be the highest possible, while also meeting sufficient resonance stability for the system.

In this case, the limits and targets of required values are being determined through trial and simulation, recorded and entered into the software program, correlating with dependencies such as temperature, a pressure level, a speed of regulation and/or a pressure gradient or similar.

The enablement or disablement of the Dither-Modulation is being initiated in correlation with the valve system pressure level to be adjusted, through the transmission system or to be activated by switching element movement or moment, a certain switching method, a present switching phase at a certain time, a particular switch procedure and range, an adoption cycle state of activation, pre-defined temperature ranges, and/or a pressure gradient.

In addition, in multi-purpose applications of different clutch systems to achieve multiple gear ratio options, commonly known in the industry in gear systems with a large amount of gear ratio options, the Dither-Modulation is either being activated or deactivated, depending on the varying support factors obtained through the automatic transmission, which cause partially unwanted sensitivities. These unwanted sensitivities occur, in the case of small pressure variations of pressure p_EDS, at the same operation state which are noticeable by the operator and they cause a reduction of the drive comfort during the downshift. Here, the activation of the Dither-Modulation represents an advantage, because an improvement in the accuracy of the regulation of pressure p_EDS contributes to a significant reduction of unwanted interference with driver comfort.

The first function block FB1 output signal represents, in addition to the average current value, a nominal value i_EDS_soll as the input signal for the second functional unit FB2, in which, through the hardware, a transformation of the pulse-width modulation, with or without the Dither-Modulation, takes place whereby the average drive current i_EDS is also the output signal of the function unit FB2, through which the electromechanical activator unit, shown as the third function unit FB3 in FIG. 3, will be supplied.

Figure 4:
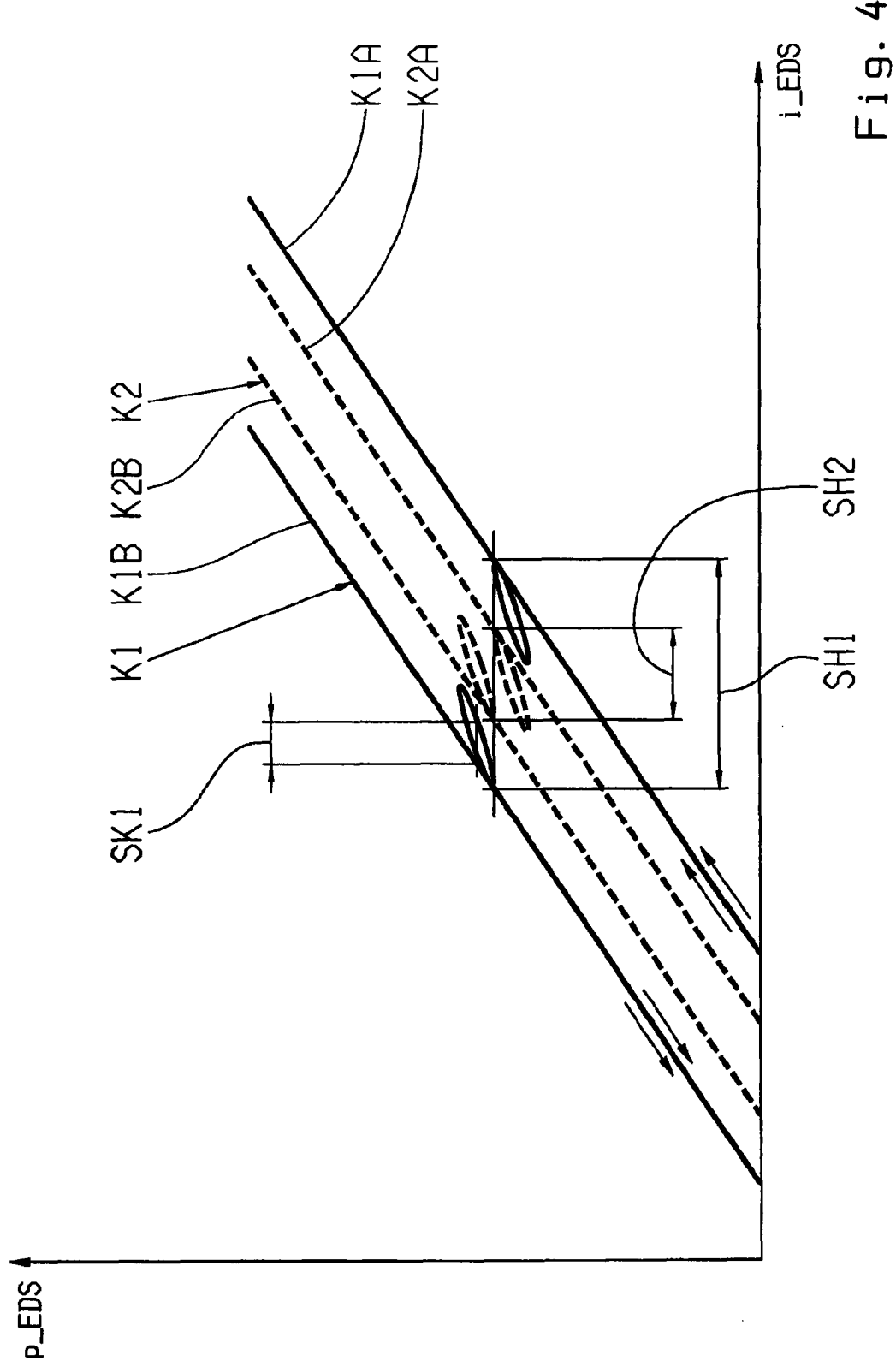
FIG. 4 is an enlarged single view of FIG. 1 in the area of X of the pressure-current characteristic curve.

FIG. 4 shows an enlarged portion of area X of FIG. 1, inside of the partial characteristic curves K1A and K1B, or K2A and K2B, respectively, of the pressure-current curves K1 and K2 in which the different speed of rotation, in the low-signal area of the gear system input speed of rotation, are initiated based on different set points.

Generally, the Dither-Modulation can easily be adopted to the system, in an easy way and at little cost, either through adjustments at a test station or in the area of a gear final test station, where also certain critical operating conditions of the vehicle drive train and gear systems, respectively, can be selectively tuned.

REFERENCE CHARACTERS IN THE DRAWINGS

A Amplitude
B1 Center line
F Frequency
FB1 to FB3 Functional Unit
H1A, H1B Hysteresis curve
I_EDS average drive current
i_EDS_soll Nominal Value, current
i_EDS1 to i_EDS4 (electric) current value
K1 pressure-current characteristic curve
K1A, K1B partial characteristic curve
K2 pressure-current characteristic curve
K2A, K2B partial characteristic curve
p_EDS pressure
pw1 pulse width Δpw pulse width value
SH1, SH2 (electrical) current hysteresis of the high-signal
SK1, SK2 (electrical) current hysteresis of the low-signal
t_z cycle
X area

The invention claimed is:

1. A method to operate a valve system of a drive train of a vehicle transmission system with a valve system unit and an engaging electro-magnetic activator unit, whereby through the valve system unit a hydraulic pressure value of the hydraulic system in the transmission of a vehicle's drive train can be set, depending on a pulse-width modulated current signal (i_EDS), present at the electro-magnetic activator unit, and at least one of an amplitude (A) and a pulse duration (pw1) of a pulse-width modulated signal, during a Dither-Modulation which is, by maintaining the pressure value to be set, whereby the valve system's lengthwise movable anchor and the connected valve shaft are now exposed to a vibration, thereby characterized that the Dither-Modulation will be activated or deactivated depending on gear shifts that are activated within a range of gear ratios, the range of gear ratios being pre-defined by a shifting strategy.

2. The method according to claim 1, further comprising the step of varying the current signal (i_EDS), through the Dither-Modulation, depending on a gradient of a set pressure (p_EDS) of the valve system.

3. A method of operating a valve system of a vehicle drive train of a transmission system including a valve system unit and an engaging electro-magnetic activator unit, whereby a hydraulic pressure of the hydraulic system in the transmission of the vehicle drive train can be set, through the valve system unit, depending on a pulse-width modulated current signal (i_EDS) present at the electro-magnetic activator unit, and one of an amplitude (A) and a pulse duration (pw1) of a pulse-width modulated signal, during a Dither-Modulation which is, by maintaining the pressure value to be set, whereby a lengthwise movable anchor, attached a valve shaft of the valve system, is exposed to a vibration; the method comprising the steps of:
one of activating and deactivating the Dither-Modulation in accordance with existing, pre-defined operating conditions of the vehicle drive train; and
varying the pulse-width current signal (i_EDS), through the Dither-Modulation, depending on a gradient of a set pressure (p_EDS) of the valve system.

4. The method according to claim 3, further comprising the step of one of activating and deactivating the Dither-Modulation upon exceeding a pressure value which was pre-defined through the valve system.

5. The method according to claim 4, further comprising the step of varying and altering the pre-defined pressure value, depending on temperature.

6. The method according to claim 3, further comprising the step of one of enabling and disabling the Dither-Modulation depending on at least one torque parameter of the transmission.

7. The method according to claim 3, further comprising the step of one of activating and deactivating the Dither-Modulation, depending on a pre-defined gear ratio change, and changing the current signal (i_EDS) during the Dither-Modulation depending on said gear ratio change.

8. The method according to claim 3, further comprising the step of one of activating the Dither-Modulation within pre-defined shift strategy ranges.

9. The method according to claim 3, further comprising the step of one of activating and deactivating the Dither-Modulation depending on defined operating temperature ranges of the vehicle drive train.

10. The method according to claim 3, further comprising the step of setting an activation pressure for the gear system of the transmission through a valve system, which is designated to provide different gear ratios for the transmission, whereby different support factors are in existence for different gear ratios, and activating and deactivating the Dither-Modulation based on these support factors.

11. The method according to claim 3, further comprising the step of altering the current signal (i_EDS) of the valve system through the Dither-Modulation in pre-defined operating conditions depending on tolerances of a pressure activated switch element of the valve system.

12. The method according to claim 3, further comprising the step of setting the at least one of the amplitude and the frequency of the Dither-Modulation depending on an accuracy and a resonance stability of the valve system.

13. The method according to claim 3, further comprising the step of varying the at least one of the amplitude and the frequency of the Dither-Modulation depending on different operating condition parameters of the drive train of the vehicle.

14. The method according to claim 3, further comprising the step of activating the Dither-Modulation during gear ratio shifts that are activated during a shift strategy for comfortable driving.

15. The method according to claim 14, further comprising the steps of defining the shift strategy for comfortable driving as a shift strategy which does not cause reactions in drive that are noticeable to a driver; and
de-activating the Dither-Modulation during gear ratio shifts that are activated outside the pre-defined range of gear ratios.

16. A method of operating a valve system of a vehicle drive train of a transmission system including a valve system unit and an engaging electro-magnetic activator unit, whereby a hydraulic pressure of the hydraulic system in the transmission of the vehicle drive train can be set, through the valve system unit, depending on a pulse-width modulated current signal (i_EDS) present at the electro-magnetic activator unit, and one of an amplitude (A) and a pulse duration (pw1) of a pulse-width modulated signal, during a Dither-Modulation which is, by maintaining the pressure value to be set, whereby a lengthwise movable anchor, attached a valve shaft of the valve system, is exposed to a vibration;
the method comprising the steps of:
one of activating and deactivating the Dither-Modulation in accordance with existing, pre-defined operating conditions of the vehicle drive train; and
calculating a self-induction in a vicinity of the electro-magnetic activation unit and, in case of exceeding a self-induction threshold, recognizing bouncing inside a mechanical fitting of the valve as part of the valve system.

* * * * *